United States Patent
Fujimori et al.

(10) Patent No.: US 6,243,395 B1
(45) Date of Patent: *Jun. 5, 2001

(54) METHOD AND APPARATUS FOR TRANSFERRING ATM CELLS VIA 1394-SERIAL DATA BUS

(75) Inventors: Takahiro Fujimori; Makoto Sato, both of Tokyo; Tomoko Tanaka, Kanagawa, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/964,176

(22) Filed: Nov. 4, 1997

(30) Foreign Application Priority Data

Nov. 6, 1996 (JP) .................................................. 8-310197

(51) Int. Cl.[7] ........................................................ H04J 3/16
(52) U.S. Cl. .......................... 370/466; 370/401; 370/503; 370/905; 370/395; 375/354
(58) Field of Search .................................. 370/465, 466, 370/467, 469, 470, 472, 473, 476, 389, 395, 399, 474, 503, 505, 506, 516, 401, 410, 524, 905, 400; 348/463, 555, 558, 564; 455/5.1, 6.1, 6.2, 6.3; 375/354, 363, 371, 211, 220, 222, 357

(56) References Cited

U.S. PATENT DOCUMENTS

| | | | |
|---|---|---|---|
| 5,745,837 | * 4/1998 | Fuhrmann | 455/5.1 |
| 5,808,660 | * 9/1998 | Sekine et al. | 370/469 |
| 5,847,771 | * 12/1998 | Cloutier et al. | 348/564 |
| 5,933,430 | * 8/1999 | Osakabe et al. | 370/395 |
| 5,995,511 | * 11/1999 | Zhou et al. | 370/400 |

* cited by examiner

*Primary Examiner*—Douglas Olms
*Assistant Examiner*—Shick Hom
(74) *Attorney, Agent, or Firm*—Frommer Lawrence & Haug, LLP.; William S. Frommer; Bruno Polito

(57) ABSTRACT

ATM data can be transferred via a highspeed serial data bus standardized by the IEEE 1394 format. In a data transferring apparatus for transferring data by employing a serial bus standardized by the IEEE 1394 format, an ATM cell transferring apparatus is comprised of an adding circuit for adding a predetermine header in order that an ATM cell used in a network defined by the ATM system is stored into the data field of the isochronous packet defined by the IEEE 1394 format.

19 Claims, 6 Drawing Sheets

NUMERALS IN BLANKS
INDICATE BITE NUMBERS

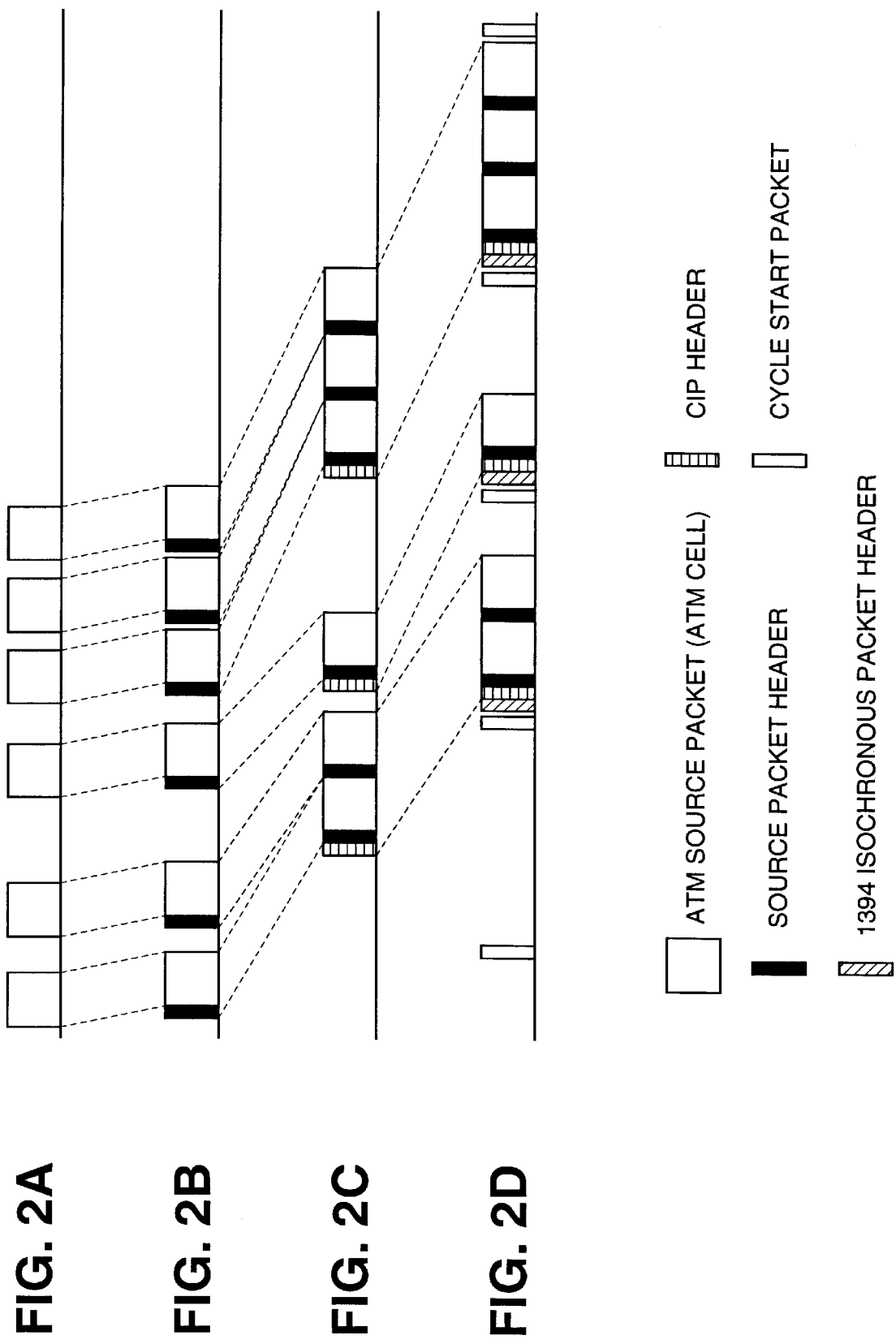

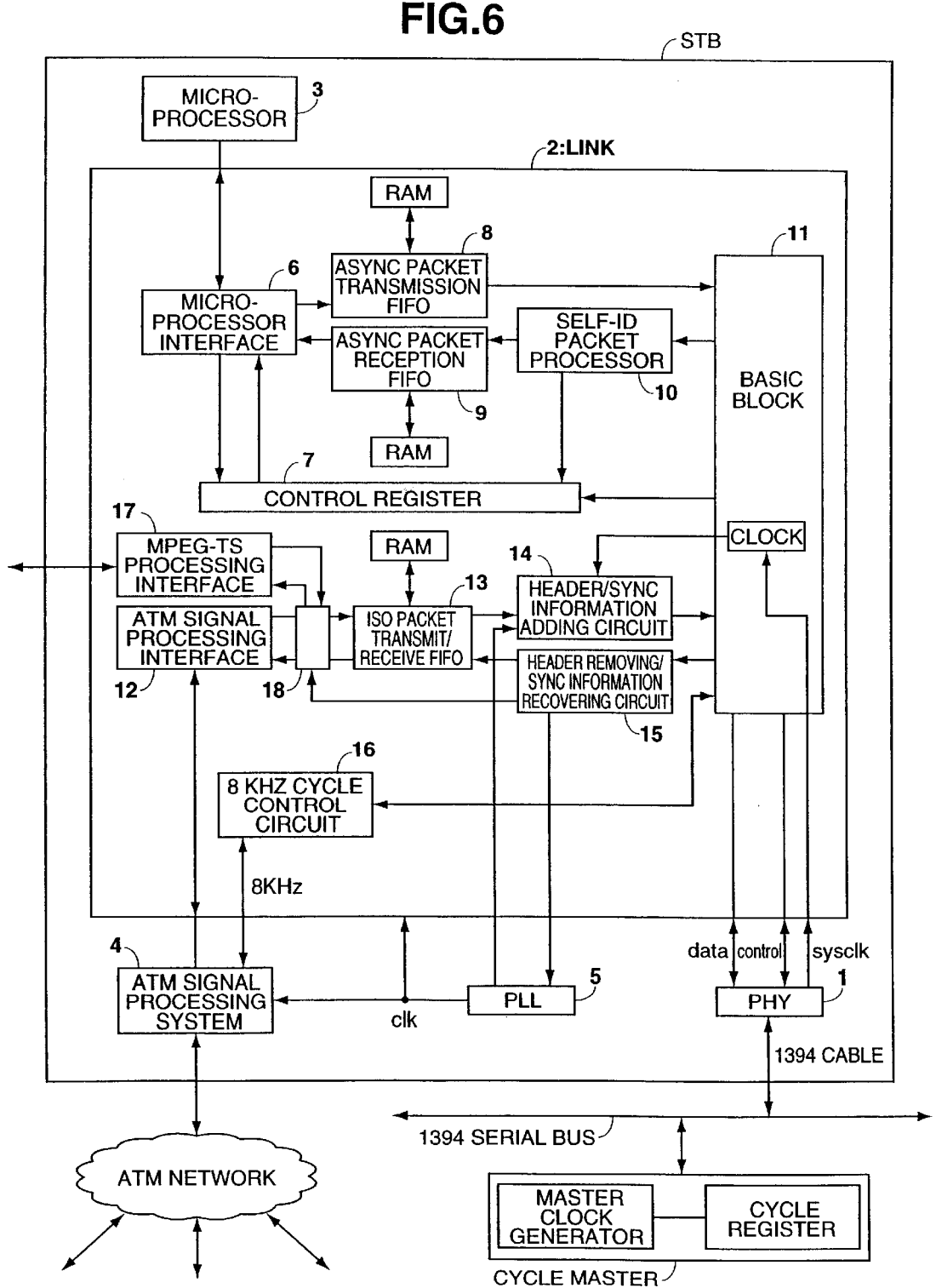

METHOD AND APPARATUS FOR TRANSFERRING ATM CELLS VIA 1394-SERIAL DATA BUS

BACKGROUND OF THE INVENTION

The present invention generally relates to an ATM cell transferring method and an ATM cell transferring apparatus. More specifically, the present invention is directed to data communication techniques capable of transferring ATM (Asynchronous Transfer Mode) data via a highspeed serial data bus standardized by IEEE 1394.

Recently, communication systems have been proposed in which various electronic appliances such as personal computers, digital video cameras, digital tuners, and hard disk units are electrically connected to each other by employing a highspeed serial data bus standardized by IEEE 1394 (will be referred to as a "1394-serial data bus" hereinafter) so as to communicate digital picture/image signals, digital audio/voice signals, and the like among these electronic appliances. In the above-described data communication systems, since the respective electronic appliances are connected to each other via the cables defined in IEEE 1394 (will be referred to as "1394-cables" hereinafter), the digital image signals and the digital audio signals can be communicated among these electronic appliances. Furthermore, all of these electronic appliances can be controlled in total sense.

On the other hand, ATM (Asynchonous Transfer Mode) is used in networks, e.g., a personal computer LAN (Local Area Network) and a B-ISDN (Broadband Integrated Service Digital Network). It should be noted that this ATM corresponds to such a format defined by ITU-T (International Telecommunication Union-Telecommunication). A packet (normally, called as a "cell") used in an ATM system owns a fixed length of 53 bytes, as illustrated in FIG. 1A, which is constructed of a 5-bite ATM cell header, and a 48-byte payload subsequent to this ATM cell header. Then, the 5-byte cell header owns such a structure as shown in FIG. 1B. Since no synchronous relationship is required between a phase of a frame and a position of a cell, and/or between positions of cells within an ATM network, this ATM system is suitably used to constitute networks where data having various bite rates are communicated in mixture manners. Under such circumstances, strong needs are made of establishing a networks with satisfying both the merits of the above-described communication system and ATM system.

SUMMARY OF THE INVENTION

The present invention has been made by considering the above-explained strong needs, and therefore, has an object to provide data transferring method/apparatus capable of transferring an ATM cell via the 1394-serial data bus.

To achieve the above-described object, an ATM cell transferring method, according to an aspect of the present invention, is featured by that a data transferring method for transferring data by employing a serial bus standardized by the IEEE 1394 format, wherein: a predetermined header is added to an ATM cell used in a network defined by the ATM system in such a manner that the ATM cell is transferred by using the structure of the isochronous packet defined by the IEEE 1394 format.

Also, an ATM cell transferring apparatus, according to another aspect of the present invention, is featured that in a data transferring apparatus for transferring data by employing a serial bus standardized by the IEEE 1394 format, an ATM cell transferring apparatus is comprised of: an adding circuit for adding a predetermined header in order that an ATM cell used in a network defined by the ATM system is stored into the data field of the isochronous packet defined by the IEEE 1394 format.

In accordance with the present invention, the ATM cell can be entered into the isochronous packet defined by IEEE 1394, and then can be sent out to the 1394-serial data bus.

BRIEF DESCRIPTION OF THE DRAWINGS

A more complete understanding of the teachings of the present invention may be acquired by referring to the accompanying figure, in which like reference numbers indicate like features and wherein:

FIG. 2A to FIG. 2D illustratively show a process operation for transferring an ATM cell via the 1394-serial data bus in accordance with the present invention;

FIG. 6 is a schematic block diagram for representing an arrangement of an ATM cell transferring apparatus, according to an embodiment of the present invention, capable of executing the process operation for transferring the ATM cell via the 1394-serial data bus.

DETAILED DESCRIPTION OF THE PREFERRED EMBODIMENTS

Referring now to drawings, ATM cell transferring method/apparatus according to various preferred embodiments of the present invention will be described in detail.

First, FIG. 2 is an illustration used to explain a process operation for processing an ATM cell which will then be transferred via a 1394-serial data bus (namely, a serial data bus defined by IEEE 1394). This process operation will be explained more in detail with reference to FIG. 6.

Figure 1A:
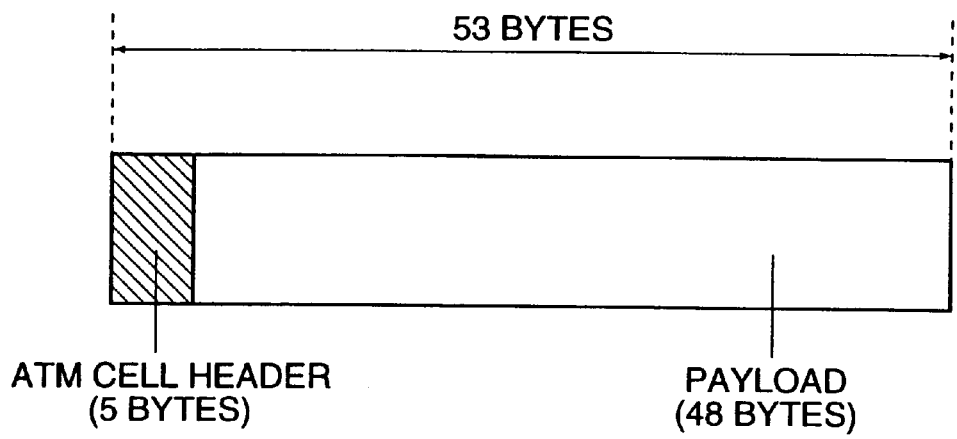
FIG. 1A and FIG. 1B schematically illustrate a structure of an ATM cell used in an ATM system.

As shown in FIG. 2A, a source packet header is added to a head portion of the inputted ATM source packet (namely, ATM cell of FIG. 1A) to thereby produce such an ATM source packet as represented in FIG. 2B. Subsequently, as represented in FIG. 2C, in response to timing at which the ATM source packet is reached to an Iso packet transmit/receive FIFO 13 (will be explained later), a CIP (Common Isochronous Packet) header is added to a head portion of a single (ATM cell+source packet header), or head portions of plural (ATM cells+source packet headers), depending upon conditions of transfer permissions to the 1394-cable. Next, as indicated in FIG. 2D, a 1394-isochronous packet header is added to the resulting ATM cell+source packet header, so that such an isochronous packet is obtained by storing the ATM cell into the data field of the isochronous packet. Then this resulting isochronous packet is sent out to the 1394 serial bus on the basis of timing of a cycle start packet flowing through the 1394 serial bus at a rate of 125 μsec. It should be noted that these source packet header, CIP header, and 1394-isochronous packet header will be described more in detail.

Figure 3:
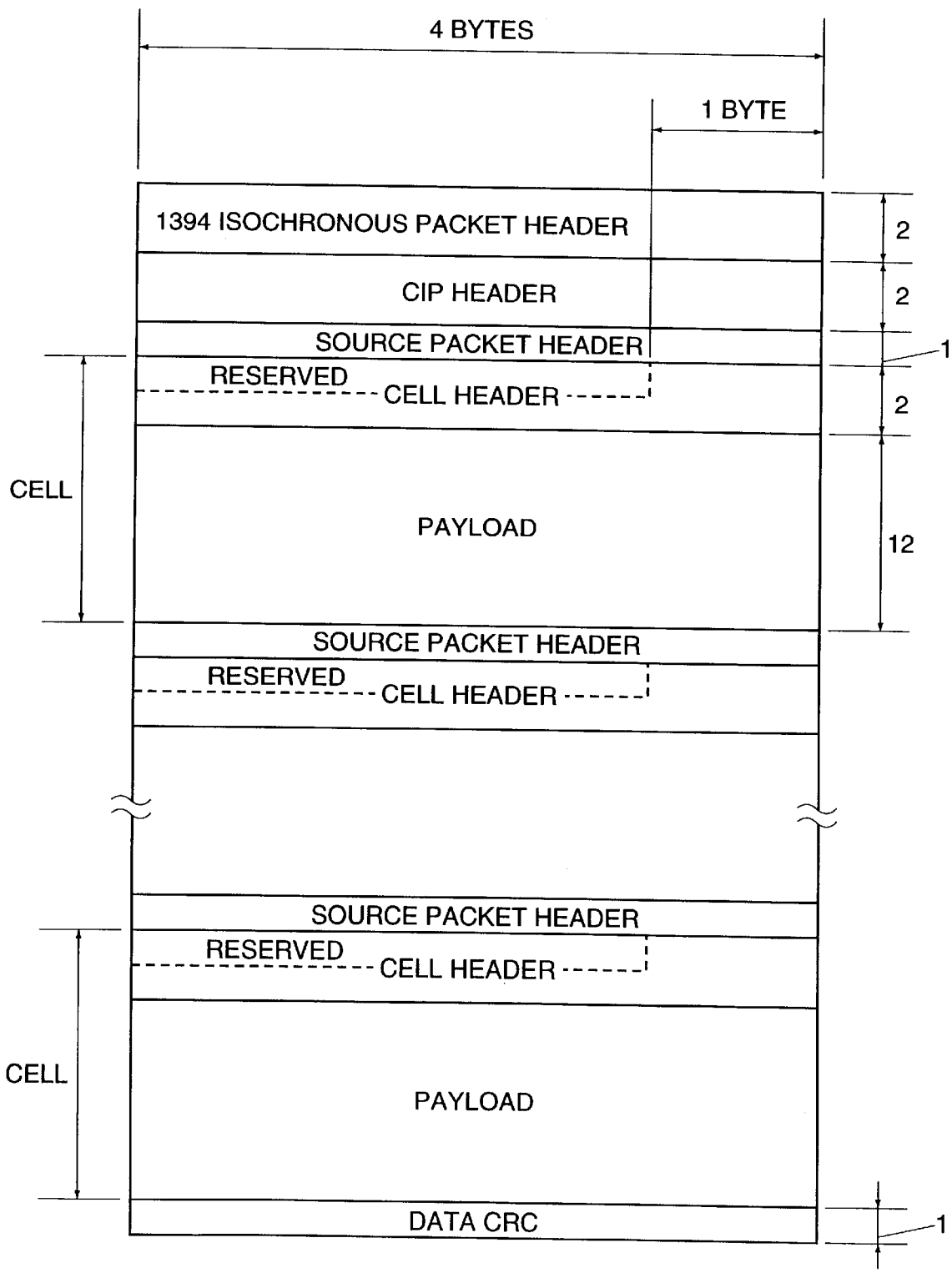
FIG. 3 schematically represents an example of a structure of an isochronous packet transferred via the 1394-serial data bus according to the present invention.
Figure 4:
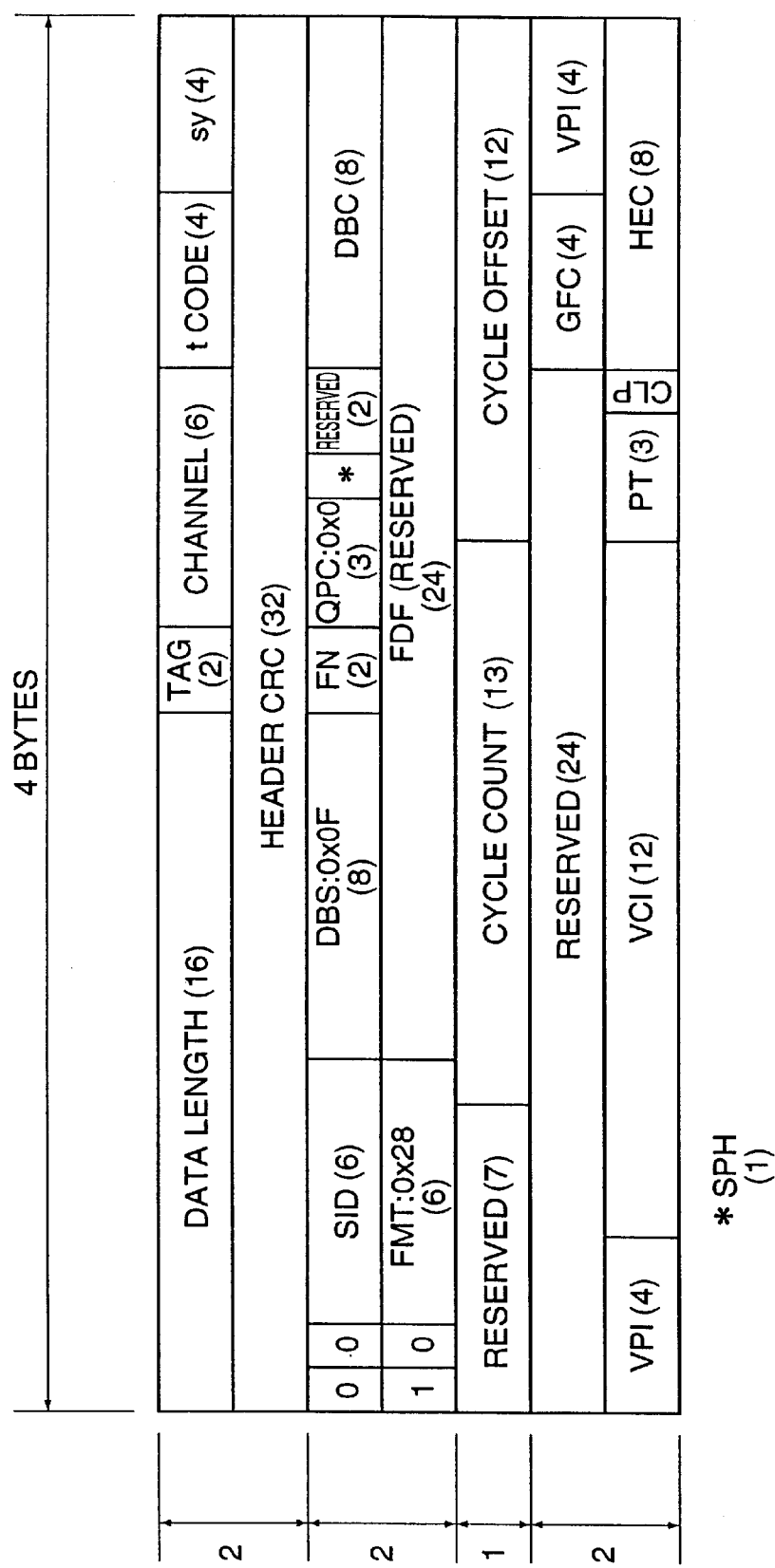
FIG. 4 illustratively indicates contents of the 1394-isochronous packet header to the cell header shown in FIG. 3.

FIG. 3 illustrates a structural example of the isochronous packet to be transferred via the 1394-serial data bus, as indicated in FIG. 2. FIG. 4 illustrates 7-byte contents of the isochronous packet from the header thereof to the cell header, shown in FIG. 3. It should also be noted that numerals in blanks of FIG. 4 indicate bite numbers. Also, it should be understood that this isochronous packet is transferred in such a way that a left end of the 1394-isochronous packet header positioned at an upper end is firstly transferred, and a right end of the data CRC positioned at a lower end is finally transferred. Referring now to FIG. 3 and FIG. 4, a description will be made of the isochronous packet.

The 1394-isochronous packet header has a length of 8 bytes, and is constituted by a data length (2 bytes) indicative of a length of data subsequent to this header; a tag (2 bits) for indicating as to whether or not the CIP header is present; a channel (6 bits) representative of a channel number through which the isochronous packet is transferred; a t-code (4 bits) indicative of a sort of a packet; an sy (4 bits) for indicating an order of the packet; and also a header CRC (4 bytes).

A 6-bit source node ID (SID) contained in the CIP header represents a node ID of an electronic appliance for sending out an isochronous packet with respect to the 1394-serial data bus. A 1-byte data block size (DBS) is a numeral for indicating a length of a data block in unit of a quadlet (=4 bytes). A 2-bite fraction number (FN) indicates the number of data blocks where a source packet is subdivided. A 3-bit quadlet padding counter (QPC) is used when the FN owns a value except for "0". A 1-bit SPH is set to "1" in the case that a source packet owns a specific source packet header. As a result, this SPH is set to "1" in this case. A data block counter (DBC) is an 8-bit continuous counter, and is used so as to detect a dropout in a source packet transfer. A 6-bit format ID field (FMT) indicates a format of data to be transferred. In this case, the FMT of 0×28 indicates ATM data. A specification of a 3-byte format depend field (FDF) is determined by the FMT.

Subsequent to the CIP header, ATM data in unit of 15 quadlets (1 quadlet=4 bytes) is transferred. The 15-quadlet data is arranged by a 1-quadlet source packet header, a 2-quadlet cell header, and a 12-quadlet payload.

A cycle count and a cycle offset of a source packet header correspond to time stamp information made by producing time instant information in unit of 125 μsec based upon a transmission time instant of a packet. This time stamp information is given from a cycle master to this source packet header. The cycle offset is given to the counting operation every 40 ns, and the cycle count value is carried up every 125 μsec. The cycle count value is sequentially counted up in such a manner that 1 count is made at 125 μsec and a 2 counts are made at 250 μsec. These cycle count and cycle offset are such values stored in a cycle time register provided within a preselected appliance, which is designated as the cycle master and is connected on the 1394-serial bus (see FIG. 6). The values are stored into the cycle time register based upon time instant information generated from a master clock generator.

This value is stored into the cycle start packet sent out to the 1394-serial data bus. As a consequence, this value is supplied to other appliances connected on the 1394-serial data bus. It should be noted that the structure of the source packet header is equivalent to such a structure defined by an MPEG type transport stream (MPEG-TS) (will be explained later).

Figure 1B:
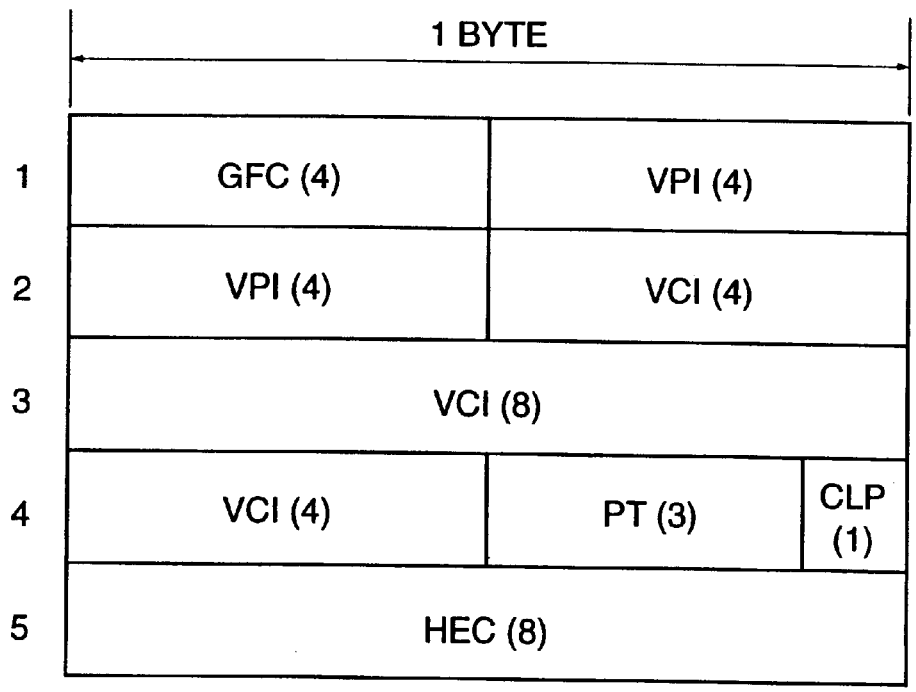

The content of the cell header is shown in FIG. 1B. Since this content is well known in the art, no further explanation thereof is made in this specification. It should be understood that symbol "reserved" of 3 bytes is additionally provided as padding in front of the 5-byte ATM cell header in this embodiment mode, this cell header has such a structure that a head portion of the payload starts from a head portion of a quadlet. This padding process operation is carried out in an ATM signal process interface 12 shown in FIG. 6 (will be discussed later).

The data CRC corresponds to an error correction code for a data field (defined from CIP header up to finally transferred cell) of the isochronous packet.

As previously described, a merit of the structures indicated in FIG. 3 and FIG. 4 is achieved by that the ATM cell can be sent out on the 1394-serial data bus. Another merit is achieved by that the source packet header owns a similar structure to that of the transport stream of MPEG. As a consequence, since such circuit blocks (will be explained later) as the Iso packet transmit/receive FIFO 13, a header/sync information adding circuit 14, and a header removing/sync information recovering circuit 15 can be commonly used in the MPEG-TS signal system, a link layer control IC can be commonly used in the circuit arrangement of FIG. 6. Therefore, there are advantages with respect to the design aspect and the manufacturing cost aspect. Moreover, it is possible to execute a time stamp process operation for absorbing a jitter phenomenon (will be explained later).

Figure 5:
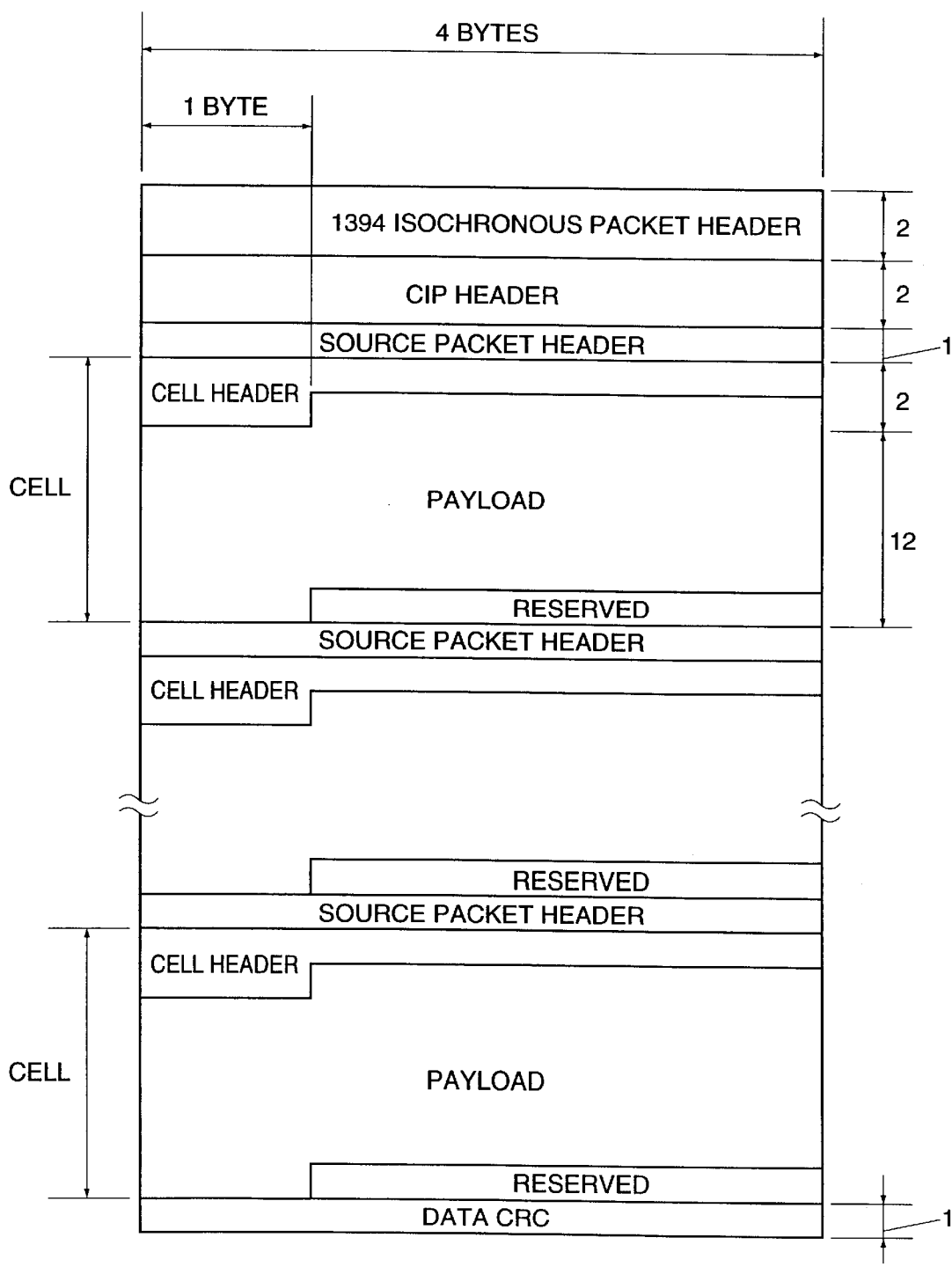
FIG. 5 schematically shows another example of a structure of an isochronous packet transferred via the 1394-serial data bus according to the present invention.

In the structures of FIG. 3 and FIG. 4, the 3-byte symbol "reserved" is entered in front of the ATM cell header. Alternatively, the 3-byte symbol "reserved" may be entered not in front of, but after the ATM cell header, so that a total length of the ATM source packet is equal to a length multiplied by 4 bytes×an integer (in this case, 56 bytes). In this alternative case, FIG. 5 represents a structure of an isochronous packet.

Now, a description will be made of an apparatus capable of executing the previously explained process operation for transferring the ATM cell via the 1394-serial data bus, for instance, a set top box (STB) connected to an ATM network. FIG. 6 schematically represents an internal arrangement of this set top box (STB), i.e., mainly shows a link layer control IC (will be referred to as a "LINK" hereinafter). This processing apparatus is equipped with a physical layer control IC (will be referred to as a "PHY" hereinafter), a LINK 2, a microprocessor 3, an ATM signal processing system 4, and a PLL 5.

The PHY 1 may initialize a bus, and may arbitrate a use right, and so on. Also, the PHY 1 may communicate data (data) such as an ATM cell, and various control signals (control) between the LINK 2 and this PHY 1, and further may transmit/receive these data and control signals to/from the 1394-data bus cable. Also, the PHY 1 may supply a system clock (sysclk). The content of this LINK 2 will be described more in detail. The microprocessor 3 controls both the PHY 1 and the LINK 2, and acquires a range (band) of an isochronous communication. The ATM signal processing system 4 receives ATM data supplied from a terminal connected to an ATM network existing outside this step top box, and then produces/resolves an ATM cell. Otherwise, this ATM signal processing system 4 transmits such an ATM cell directly entered therein the ATM network to the ATM signal process interface 12. Also, this ATM signal processing system 4 supplies a basic frequency clock of 8 KHz owned by the ATM network to an 8 KHz-cycle control circuit 16. The PLL 5 reproduces a clock signal (clk) of an electronic appliance provided on the transmission end from timing information (above-described time stamp information)

derived from a source packet header attached to an ATM cell received via the 1394-cable. This timing information is derived by the header removing/sync information recovering circuit 15 from the source packet header among the data received from the 1394-cable. It should be understood that when the timing information is not received via the 1394-cable, this PLL 5 may oscillate the clock signal in the self-oscillating manner. Then, this clock signal is supplied to the LINK 2 and the ATM signal processing system 4.

The internal arrangement of the LINK 2 may be mainly subdivided into an isochronous system, an asynchronous system, and a basic block. The isochronous system corresponds to such a block for producing an analyzing an isochronous packet on which data of an ATM cell is superimposed. The asynchronous system corresponds to such a block for producing and analyzing an asynchronous packet on which a control signal is superimposed. This control signal is, for instance, a command used to control an electronic appliance.

The asynchronous system is arranged by a microprocessor interface 6, a control register 7, an asynchronous packet transmission FIFO 8, an asynchronous packet reception FIFO 9, and a self-ID packet processing block 10.

The basic block 11 is equipped with a clock, a CRC, a physical layer interface a transmission block, a reception block, and the like.

The isochronous system is constituted by an ATM signal interface 12, an isochronous packet transmit/receive FIFO 13, a header/sync information adding circuit 14, a header removing/sync information recovering circuit 15, and an 8 KHz-cycle control circuit 16.

The microprocessor interface 6 may transmit/receive data in response to a demand issued from an upper grade layer between the microprocessor 3 and this microprocessor interface 6.

The data is written into a predetermined storage position of the control register 7 under control of the microprocessor 3, so that the operation of the LINK 2 is controlled. When the asynchronous packet is transmitted/received, a predetermined address of the control register 7 is read/written. Furthermore, a portion of the header of the isochronous packet is transmitted and received by utilizing this control register 7. For example, the above-described SID contained in the CIP header is supplied to the control register 7 from the basic block 11, and the control register 7 transfers the information of the source node ID via the microprocessor interface 6 to the microprocessor 3. As a result, the information about the original source node can be recognized by this set top box (STB) without being removed by the header removing/sync information receiving circuit 15.

The packet produced by the microprocessor 3 is temporarily stored into the asynchronous packet transmission FIFO 8. The temporarily stored packet is read by the basic block 11 as soon as the bus is brought into the empty state.

The packet acquired from the bus is written into the asynchronous packet reception FIFO 9 by the basic block 11. The microprocessor 3 executes the reading operation after confirming such a fact that this asynchronous packet reception FIFO 9 is not brought into the empty state.

The self-ID packet processing block 10 processes the node information received while the bus is initialized, and senses which node may manage the number of nodes connected to the bus, and also the isochronous channel of the bus.

The physical layer interface of the basic block 11 performs a parallel-to-serial conversion of transmission data, and a serial-to-parallel conversion of reception data. The transmission block judges a condition of the bus so as to control the packet transmission. Then, the reception block determines a write destination, depending upon the sort of the received packet, namely the asynchronous packet, or the isochronous packet.

The ATM signal processing interface 12 executes the above-described padding process operation for the data of the ATM signal processing system 4 during the signal transmission to thereby convert this data into the data with the isochronous packet format. During the signal reception, the ATM signal processing interface 12 performs an inverse process operation, namely removes the padded byte from the padding-processed data.

The isochronous packet transmit/receive FIFO 13 corresponds to such a FIFO having a transmission function of an isochronous packet and also a reception function of an isochronous packet. As previously explained, during the signal transmission, the ATM cell (see FIG. 2A) received from the ATM network is written via the ATM signal processing system 4 and the ATM signal processing interface 12 into this isochronous packet transmit/receive FIFO 13. There is a cycle packet flowing in a cycle of 125 $\mu$sec on the 1394-cable. In response to this timing, the ATM cell which has been waited in the FIFO 13 is sent out to the 1394-serial data bus by the basic block 11 at such a stage that the transmission permission is issued. In this case, since the header adding process operation is instantaneously performed in the header/sync information adding circuit 14, there is no problem with respect to the temporal aspect. As previously explained, since the ATM cell is waited in the FIFO 13, the ATM cell buffering operation is carried out, so that the jitter phenomenon of the ATM cell can be avoided. In general, a source of an ATM cell becomes unstable, because a jitter phenomenon on the order of 2 msec occurs. Therefore, a buffering operation by a FIFO may constitute a significant operation. Even when the source of the ATM cell sends out the cell under constant cell rate, the time interval between the ATM cells is greatly varied, since the cell sending time is delayed every time the ATM cell has passed several ATM switches. As a consequence, there is a certain possibility in delaying of such a cycle that a plurality of ATM cells are sent out in a continuous manner. Accordingly, the source packet header is added to each of the ATM cells (see FIG. 1B). Then, the CIP header and the 1394-isochronous packet header are properly added to such a cell which is outputted in connection with the cycle on the 1394-serial data bus (see FIG. 2C and FIG. 2D), and then the resulting cell is transferred to the 1394-serial data bus. In the case that an MPEG-TS type signal is transmitted/received, a communication is established between this isochronous packet transmit/receive FIFO 13 and an external appliance (not shown) via the MPEG-TS processing interface 17. In this case, a path is selected iv a switching unit 18. It should also be noted that the MPEG-TS signal is inputted via the 1394 cable, identification data contained in the header of this MPEG-TS signal is detected by the header removing/sync information recovering circuit 15, and the switching unit 18 is controlled in response to the detected identification data. In the case of the MPEG-TS system, since the source is relatively constant (jitter on the order of 200 $\mu$sec), there is not so much jitter, as compared with that of the ATM cell. However, when the MPEG-TS type signal is transferred to the 1394-serial data bus in the cycle of 125 $\mu$sec, and also is received therefrom, there is a temporal shift in the transmission system. As a consequence, this isochronous packet transmit/receive FIFO 13 may also play a role capable of absorbing this temporal shift. As previously described, the jitter problem can be improved by buffering the cell and by adjusting the cell rate before the cell is transferred to the 1394-serial data bus.

Also, since the peak rate of the cells appearing on the 1394-serial data bus can be lowered, the range used in the isochronous communication can be saved. After the isochronous packet which has been received from the 1394-serial data bus and acquired via the PHY 1 and the basic block 11 is converted into the structure of the ATM cell by the header removing/sync information recovering circuit 15, the resulting ATM cell packet is written into the isochronous packet transmit/receive FIFO 13 in such a range that the ATM cells are not overflown from this FIFO 13. The timing of the written ATM cell packet at which this ATM cell packet is outputted from the LINK 2 to the ATM signal processing system 4 is produced in response to the clock signal which is reproduced by the PLL 5 based upon the timing information contained in the header separated by the header removing/sync information recovering circuit 15.

The header/sync information adding circuit 14 adds the source packet header, the CIP header, and the 1394-isochronous packet header, as indicated in FIG. 3 and FIG. 4, to the cell read out from the isochronous packet transmit/receive FIFO 13. At this time, since the cycle count and the cycle offset within the source packet header are set with reference to the value of the clock employed in the basic block, the time stamp may be given to the cell. This clock is adjusted to the reference time based upon the time instant information contained in the cycle start packet sent from the cycle master, and also is counted up by the 8 KHz-cycle control circuit 16.

The header removing/sync information recovering circuit removes the 1394-isochronous packet header, the CIP header, and the source packet header from the isochronous packet received from the basic block 11, and thereafter writes only the cell into the isochronous packet transmit/receive FIFO 13.

The 18 KHz-cycle control circuit 16 causes the signal having the frequency of 8 KHz owned by the ATM network to be synchronized with the signal having the frequency of 8 KHz (125 μsec) appearing in the 1394-serial data bus. In other words, the timing of 8 KHz derived from the ATM network is acquired via the ATM signal processing system 4, and also the 8 KHz-signal of the cycle start packet obtained via the basic block 11 is synchronized with this 8 KHz-timing, so that the ATM cell can be handled on the IEEE 1394 system.

While the ATM cell transferring apparatus according to the present invention has been described in detail, the ATM cell can be transferred via the 1394-serial data bus for the communication purpose.

What is claimed is:

1. A method of transferring Asynchronous Transfer Mode ATM data via a data bus compatible with the Institute of Electrical and Electronic Engineers 1394 IEEE 1394 standard, comprising the steps of:

synchronizing a clock of said data bus with a clock of an ATM network associated with said ATM data;

adding a Common Isochronous Packet CIP header to an ATM cell of the ATM data;

adding an isochronous packet header compatible with the IEEE 1394 standard, a 1394 isochronous packet header, to the combination of the CIP header and ATM cell to generate a combined 1394 isochronous packet header CIP header and ATM cell; and transferring the combined 1394 isochronous packet header, CIP header and ATM cell via said data bus.

2. The method according to claim 1, further comprising the step of mapping a source packet to said ATM cell, wherein when said source packet has a byte length longer than the byte length of said ATM cell and said ATM cell is padded by an amount equal to a difference between the byte length of said source packet and the byte length of said ATM cell.

3. The method according to claim 2, wherein said ATM cell includes a 48 byte payload and a 5 byte cell header, and when said ATM cell is mapped to a source packet having a 56 byte length and said ATM cell is padded by either adding 3 bytes to a head portion of said ATM cell or adding 3 bytes to a last portion of said payload.

4. The method according to claim 1, wherein a source packet header is added to said ATM cell, said source packet header being similar to a header used in the Motion Picture Experts Group MPEG transport stream.

5. The method according to claim 4, wherein said source packet header includes cycle count data and cycle offset data.

6. An apparatus for transferring Asynchronous Transfer Mode ATM data via a data bus compatible with the Institute of Electrical and Electronic Engineers 1394 IEEE 1394 standard, comprising:

means for synchronizing a clock of said data bus with a clock of an ATM network associated with said ATM data;

an adding circuit for adding a Common Isochronous Packet CIP header to a cell of said ATM data, and for adding an isochronous packet header compatible with the IEEE 1394 standard, a 1394 isochronous packet header, to the combination of said CIP header and ATM cell to generate a combined 1394 isochronous packet header, CIP header and ATM cell; and a transferring circuit for transferring the combined 1394 isochronous packet header, CIP header and ATM cell via said data bus.

7. The apparatus according to claim 6, further comprising a buffer for buffering said ATM cell, said buffer being operable to improve a jitter component produced when said ATM cell is passed to said data bus.

8. A method for receiving an Asynchronous Transfer Mode ATM cell used in an ATM network, said ATM cell having been transferred via a data bus compatible with the Institute of Electrical and Electronic Engineers 1394 IEEE 1394 standard by adding a Common Isochronous Packet CIP header to said ATM cell, adding an isochronous packet header compatible with the IEEE 1394 standard, a 1394 isochronous packet header, to the combination of said CIP header and ATM cell to generate a combined 1394 isochronous packet header, CIP header and ATM cell, and transferring the combined 1394 isochronous packet header, CIP header and ATM cell via said data bus, said method for receiving comprising the steps of:

synchronizing a clock of said data bus with a clock of said ATM network;

receiving said combined 1394 isochronous packet header, CIP header and ATM cell; and removing said 1394 isochronous packet header and said CIP header from said combined 1394 isochronous packet header, CIP header and ATM cell.

9. The method according to claim 8, wherein said received ATM cell has been mapped to a source packet having a byte length longer than the byte length of said ATM cell and padding of an amount equal to a difference between the byte length of said source packet and the byte length of said ATM cell has been added to said ATM cell, further comprising the step of removing said padding.

10. The method according to claim 9, wherein said received ATM cell includes a 48 byte payload and a 5 byte cell header, and said padding is 3 bytes long and has been added to either a head portion of said ATM cell or to a last portion of said payload.

11. The method according to claim 8, wherein said received ATM cell includes a source packet header which is similar to a header used in the Motion Picture Experts Group MPEG transport stream.

12. The method according to claim 11, wherein said source packet header includes cycle count data and cycle offset data.

13. An apparatus for receiving an Asynchronous Transfer Mode ATM cell used in an ATM network, said ATM cell having been transferred via a data bus compatible with the Institute of Electrical and Electronic Engineers 1394 IEEE 1394 standard by adding a Common Isochronous Packet CIP header to said ATM cell, adding an isochronous packet header compatible with the IEEE 1394 standard, a 1394 isochronous packet header, to the combination of said CIP header and ATM cell to generate a combined 1394 isochronous packet header, CIP header and ATM cell, and transferring the combined 1394 isochronous packet header, CIP header and ATM cell via said data bus, the apparatus comprising:

means for synchronizing a clock of said data bus with a clock of said ATM network;

a receiving circuit for receiving said combined 1394 isochronous packet header, CIP header and ATM cell; and a removing circuit for removing said 1394 isochronous packet header and said CIP header from said combined 1394 isochronous packet header, CIP header and ATM cell.

14. A link layer controlling integrated circuit capable of transmitting and receiving Asynchronous Transfer Mode ATM data via a data bus compatible with the Institute of Electrical and Electronic Engineers 1394 IEEE 1394 standard, wherein a cell of said ATM data is transferred via said data bus by adding a Common Isochronous Packet CIP header to said ATM cell, adding an isochronous packet header compatible with the IEEE 1394 standard, a 1394 isochronous packet header, to the combination of said CIP header and ATM cell to generate a combined 1394 isochronous packet header CIP header and ATM cell and transferring the combined 1394 isochronous packet header, CIP header and ATM cell via said data bus, the integrated circuit comprising:

a basic block for communicating with said data bus;

an ATM network interface;

an adding circuit for adding said CIP header and said 1394 isochronous packet header to said ATM cell in preparation for transfer over said data bus;

a removing circuit for removing a received CIP header and a received 1394 isochronous packet header from a received ATM cell upon reception of a combination CIP header, 1394 isochronous packet header and ATM cell via said data bus; and a buffer provided between said adding circuit and said ATM network interface and between said removing circuit and said ATM network interface for buffering data between said interface and said adding and removing circuits.

15. A method of transferring Asynchronous Transfer Mode ATM data via a data bus compatible with the Institute of Electrical and Electronic Engineers 1394 IEEE 1394standard, comprising the steps of;

synchronizing a clock of said data bus with a clock of an ATM network associated with said ATM data;

adding a Common Isochronous Packet CIP header to said data;

adding an isochronous packet header compatible with the IEEE 1394 standard, a 1394 isochronous packet header, to the combination of the CIP header and said data to generate a combined 1394 isochronous packet header CIP header and data; and transferring the combined 1394 isochronous packet header, CIP header and data via said data bus.

16. An apparatus for transferring Asynchronous Transfer Mode ATM data via a data bus compatible with the Institute of Electrical and Electronic Engineers 1394 IEEE 1394standard, comprising:

means for synchronizing a clock of said data bus with a clock of an ATM network associated with said ATM data;

an adding circuit for adding a Common Isochronous Packet CIP header to said data, and for adding an isochronous packet header compatible with the IEEE 1394 standard, a 1394 isochronous packet header, to the combination of said CIP header and said data to generate a combined 1394 isochronous packet header CIP header and data; and a transferring circuit for transferring the combined 1394 isochronous packet header, CIP header and data via said data bus.

17. A method for receiving Asynchronous Transfer Mode ATM data used in an ATM data network, said data having been transferred via a data bus compatible with the Institute of Electrical and Electronic Engineers 1394 IEEE 1394 standard by adding a Common Isochronous Packet CIP header to said data, adding an isochronous packet header compatible with the IEEE 1394 standard, a 1394 isochronous packet header, to the combination of said CIP header and said data to generate a combined 1394 isochronous packet header, CIP header and data, and transferring the combined 1394 isochronous packet header, CIP header and data via said data bus, said method for receiving comprising the steps of:

synchronizing a clock of said data bus with a clock of said ATM network;

receiving said combined 1394 isochronous packet header, CIP header and data; and removing said 1394 isochronous packet header and said CIP header from said combined 1394 isochronous packet header, CIP header and data.

18. An apparatus for receiving Asynchronous Transfer Mode ATM data used in an ATM data network, said data having been transferred via a data bus compatible with the Institute of Electrical and Electronic Engineers 1394 IEEE 1394 standard by adding a Common Isochronous Packet CIP header to said data, adding an isochronous packet header compatible with the IEEE 1394 standard, a 1394 isochronous packet header, to the combination of said CIP header and said data to generate a combined 1394 isochronous packet header, CIP header and data, and transferring the combined 1394 isochronous packet header, CIP header and data via said data bus, the apparatus comprising:

synchronizing a clock of said data bus with a clock of said ATM network;

a receiving circuit for receiving said combined 1394 isochronous packet header, CIP header and data; and a removing circuit for removing said 1394 isochronous packet header and said CIP header from said combined 1394 isochronous packet header, CIP header and data.

19. A link layer controlling integrated circuit capable of transmitting and receiving data via a data bus compatible with the Institute of Electrical and Electronic Engineers 1394 IEEE 1394 standard, wherein said data is transferred via said data bus by adding a Common Isochronous Packet CIP header to said data, adding an isochronous packet header compatible with the IEEE 1394 standard, a 1394 isochronous packet header, to the combination of said CIP header and data to generate a combined 1394 isochronous packet header, CIP header and data and transferring the combined 1394 isochronous packet header, CIP header and data via said data bus, the integrated circuit comprising:

a basic block for communicating with said data bus;

a network interface;

an adding circuit for adding said CIP header and said 1394 isochronous packet header to data in preparation for transfer over said data bus;

a removing circuit for removing a received CIP header and a received 1394 isochronous packet header from data upon reception of a combination CIP header, 1394 isochronous packet header and data via said data bus; and a buffer provided between said adding circuit and said network interface and between said removing circuit and said network interface for buffering data between said interface and said adding and removing circuits.

* * * * *